United States Patent

Kimura

[11] Patent Number: 5,814,964
[45] Date of Patent: Sep. 29, 1998

[54] STEPPING MOTOR DRIVING METHOD

[75] Inventor: Makoto Kimura, Yokohama, Japan

[73] Assignee: Unisia Jecs Corporation, Atsugi, Japan

[21] Appl. No.: 676,808

[22] Filed: Jul. 8, 1996

[30] Foreign Application Priority Data

Jul. 6, 1995 [JP] Japan .................................. 7-170792

[51] Int. Cl.⁶ .......................... G05B 19/40; B60G 11/26
[52] U.S. Cl. ......................... 318/685; 318/609; 318/696;
280/707; 280/714; 188/299; 188/319
[58] Field of Search ................................. 280/707, 714,
280/703, 709; 188/299, 319, 322.15; 318/696,
685, 600, 601, 603, 609, 671

[56] References Cited

U.S. PATENT DOCUMENTS

| | | | |
|---|---|---|---|
| 4,564,796 | 1/1986 | Yoshino et al. | 318/696 |
| 4,871,954 | 10/1989 | Rathgeber | 318/466 |
| 4,906,910 | 3/1990 | Tanuma et al. | 318/696 |
| 5,007,751 | 4/1991 | Yamakawa | 400/322 |
| 5,269,558 | 12/1993 | Yoshioka et al. | 280/707 |
| 5,360,089 | 11/1994 | Nakamura et al. | 188/299 |
| 5,520,150 | 5/1996 | Kimoto | 123/339 |

FOREIGN PATENT DOCUMENTS

| | | |
|---|---|---|
| 44 26 457 | 2/1995 | Germany . |
| 63-112914 | 7/1988 | Japan . |
| 6-58361 | 3/1994 | Japan . |
| 84/03369 | 8/1984 | WIPO . |

*Primary Examiner*—John W. Cabeca
*Attorney, Agent, or Firm*—Foley & Lardner

[57] ABSTRACT

A method of driving a stepping motor operable on a control signal having a predetermined number of excitation patterns switched in a predetermined sequence during each excitation cycle to rotate, at a predetermined angle defined by two stop positions, through step positions having sequential step numbers with respect to a reference step position. A control unit is powered from a source of power for producing the control signal to the stepping motor. The control unit has a memory for storing a control step position upon interruption of the power to the control unit. The stepping motor is reset to an initial step position set near one of the stop positions when the power to the control unit is resumed. A target step position is set at a step number equal to the step number of the initial step position plus the number of excitation patterns included in each excitation cycle. The stepping motor is driven to make steps in number equal to a difference of the step number of the control step position stored in the memory from the step number of the target step position.

4 Claims, 5 Drawing Sheets

STEPPING MOTOR DRIVING METHOD

BACKGROUND OF THE INVENTION

This invention relates to a method of driving a stepping motor operable by a control signal having a predetermined number of excitation patterns switched in a predetermined sequence to rotate at a predetermined angle defined by two stop positions.

For example, Japanese Utility Model Kokai No. 63-112914 discloses an automotive vehicle suspension control system which employs stepping motors for controlling the damping force characteristics of the respective shock absorbers provided on an automotive vehicle. Before the damping force characteristic control, each of the stepping motors is returned to its initial step position. Since the stop position at which the stepping motor is placed upon power interruption is different from one case to another, the initialization requires the stepping motor to rotate at a predetermined angle defined by two stoppers. If the stepping motor stops at a step position near one of the stoppers upon power interruption, the stepping motor will remain driven after its rotor comes into collision with the one stopper and the rotor will repetitively come into collision with the stopper to produce noise.

SUMMARY OF THE INVENTION

It is a main object of the invention to provide an improved stepping motor driving method which can minimize the noise which may be produced when the rotor of the stepping motor comes into collision with the stopper placed at a stop position.

There is provided, in accordance with the invention, a method of driving a stepping motor operable on a control signal having a predetermined number of excitation patterns switched in a predetermined sequence during each excitation cycle to rotate, at a predetermined angle defined by two stop positions, through step positions having sequential step numbers with respect to a reference step position. The method comprises the steps of: with a control unit powered from a source of power for producing the control signal to the stepping motor, the control unit having a memory held powered for storing a control step position upon interruption of the power to the control circuit and means for resetting the stepping motor to an initial step position set near one of the stop positions when the power to the control unit is resumed, setting a target step position at a step number equal to the step number of the initial step position plus the number of excitation patterns included in each excitation cycle; and driving the stepping motor to make steps in number equal to a difference of the step number of the control step position stored in the memory from the step number of the target step position.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
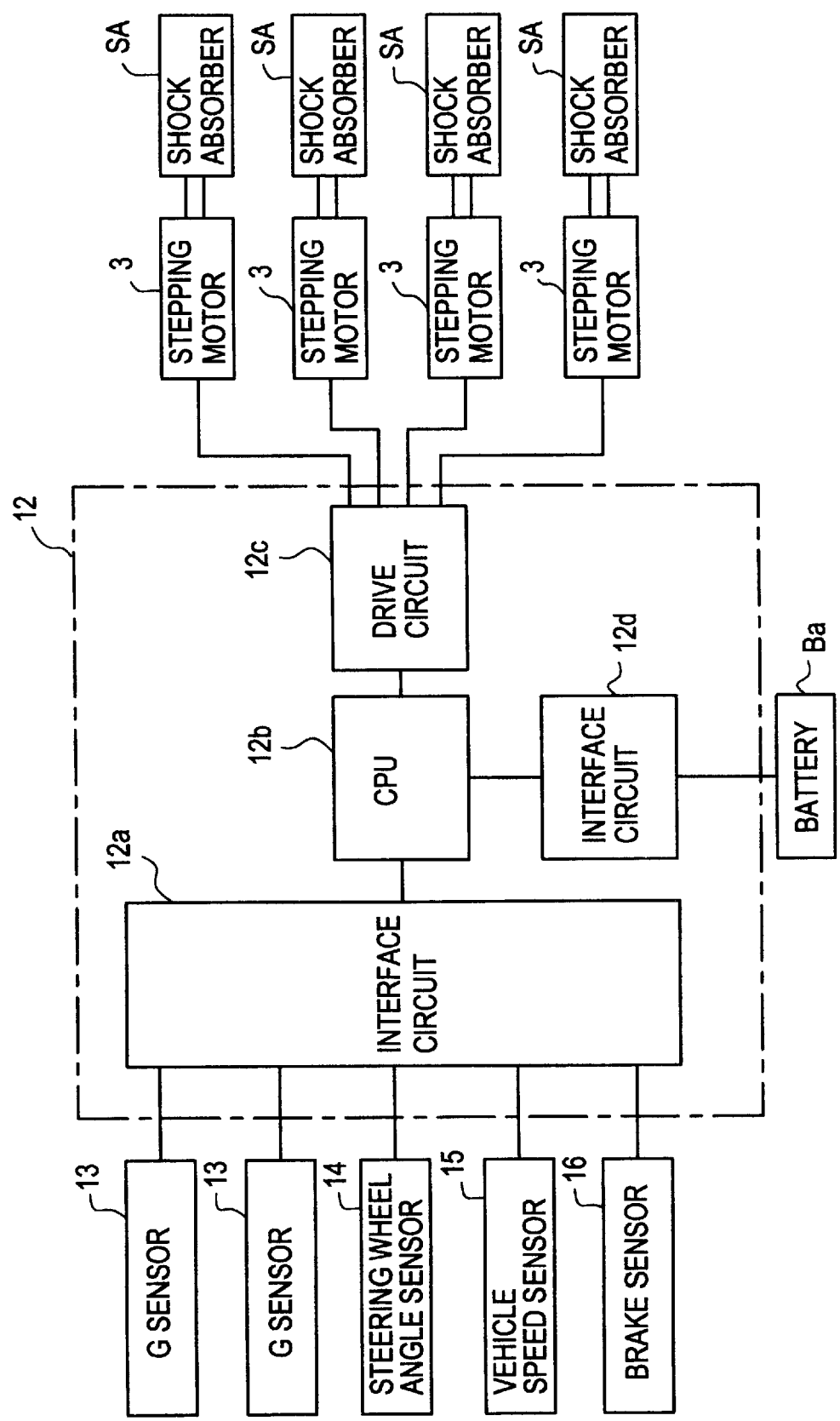
FIG. 1 is a schematic diagram showing an automotive vehicle suspension control system embodying the invention.

With reference to the drawings, and in particular to FIG. 1, there is shown a schematic diagram of an automotive vehicle suspension control system embodying the invention. The suspension control system is shown as including a control unit 12 for driving stepping motors 3 in a manner to provide optimum damping force characteristics for shock absorbers SA interposed at the positions of the respective road wheels of the vehicle between a sprung mass (vehicle body) and an unsprung mass (tire wheel). The control unit 12 includes a first interface circuit 12*a*, a central processing unit (CPU) 12*b*, a drive circuit 12*c* and a second interface circuit 12*d*. The central processing unit 12*b* calculates desired damping force characteristics (in the form of damping coefficients) to be provided for the respective shock absorbers SA. These calculations are made based on signals fed thereto through the first interface circuit 12*a* from various sensors including acceleration sensors 13, a steering wheel angle sensor 14, a vehicle speed sensor 15 and a brake sensor 16. The G sensors 13 are mounted on the vehicle body (sprung mass) near the road wheel positions to sense the vertical accelerations G of the vehicle body (sprung mass) at the respective road wheel positions and it produces sensor signals indicative of the sensed vertical accelerations to the interface circuit 12*a*. The steering wheel angle sensor 12 is provided to sense the angle of rotation of the vehicle steering angle and it produces a sensor signal indicative of the sensed steering wheel angle to the first interface circuit 12*a*. The vehicle speed sensor 15 is provided to sense the speed of running of the vehicle and it produces a sensor signal indicative of the sensed vehicle speed. The brake sensor 16 is associated with a brake pedal and produce a signal in the presence of vehicle braking. The central processing unit 12*b* transfers the control word specifying the calculated damping coefficient to the drive circuit 12*c* for producing a control signal V to drive a corresponding one of the stepping motors 3 to provide the calculated damping force characteristic. The central processing unit 12*b* is powered through the second interface circuit 12*d* from a car battery Ba. The drive circuit 12*c* also produces a step drive signal for driving the corresponding one of the stepping motors 3 to its control step position based on the corresponding control signal V transferred thereto from the central processing unit 12*b*. The central processing unit 12*b* is considered as having a memory for storing data required for the suspension control and data related to the control step positions for the respective stepping motors 3. This memory is always powered from the car battery Ba to hold the data stored therein.

Figure 2:
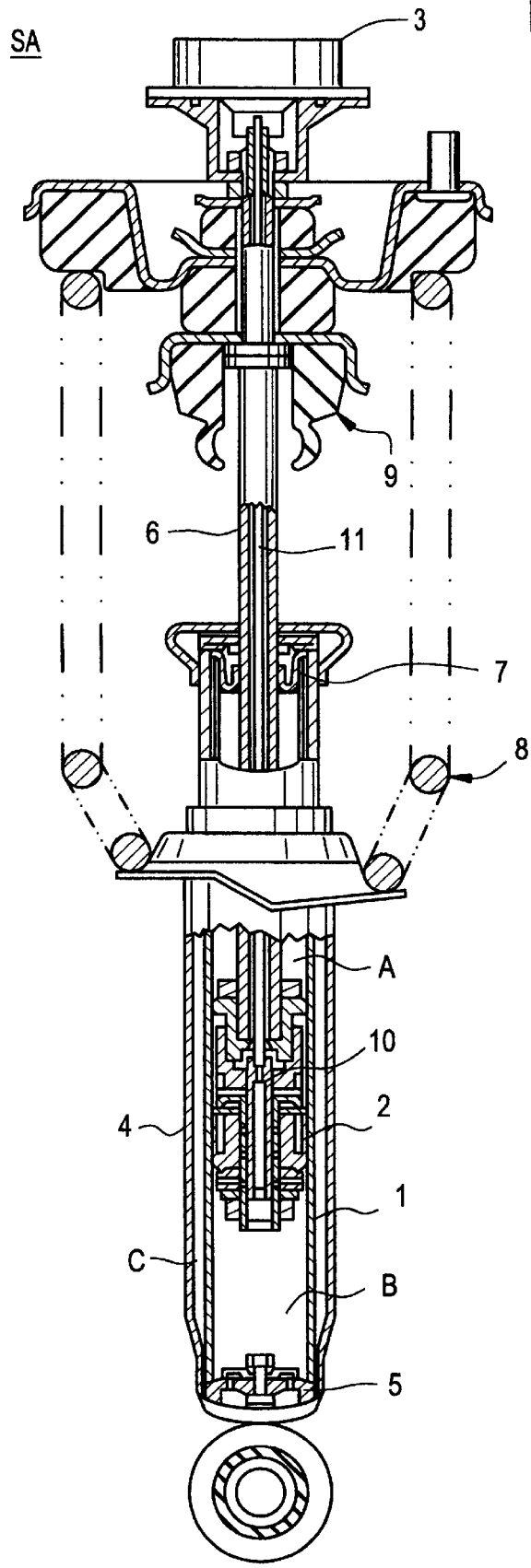
FIG. 2 is an enlarged sectional view showing the detailed structure of each of the shock absorbers used in the suspension control system of FIG. 1.
Figure 3:
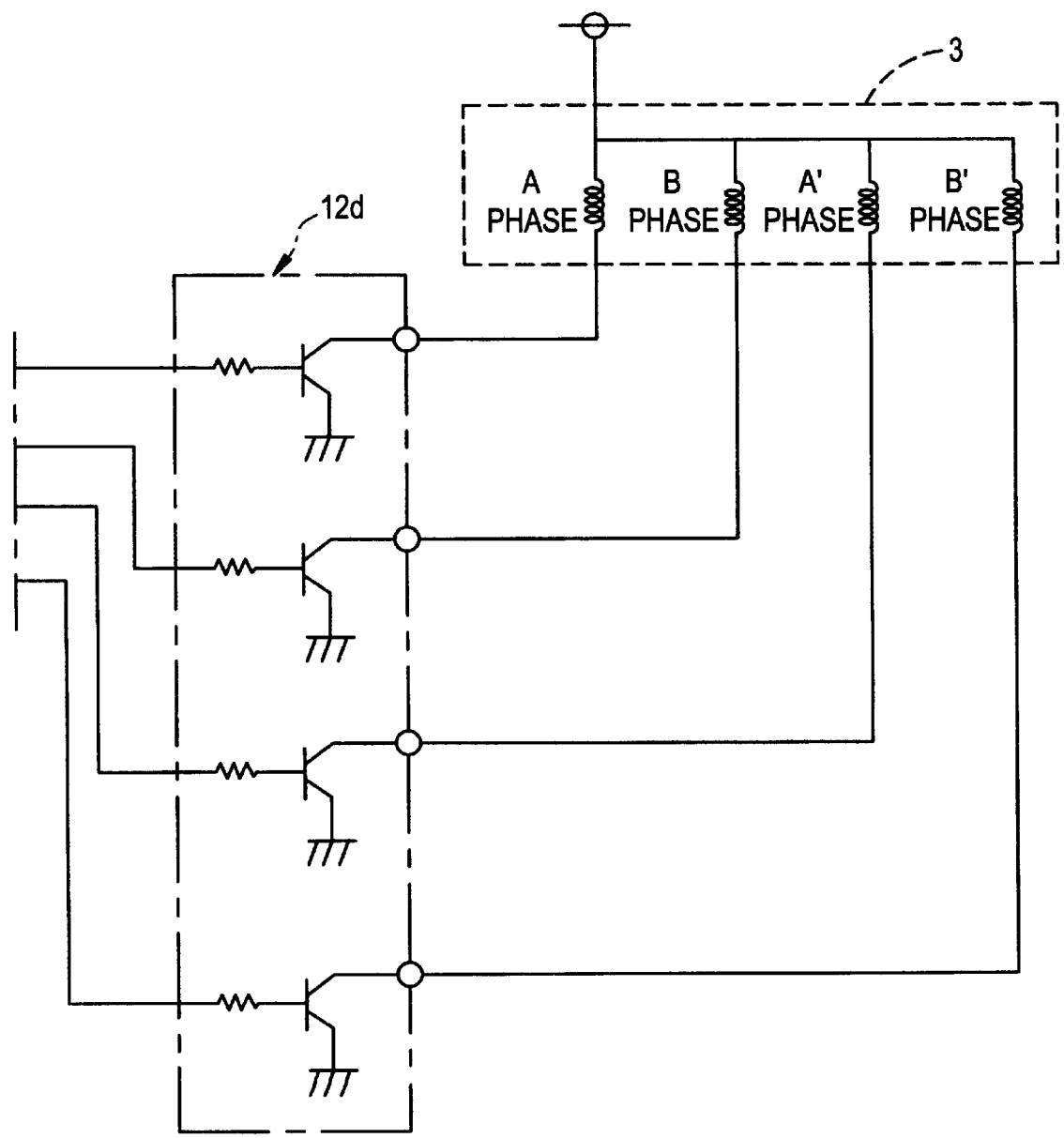
FIG. 3 is a circuit diagram showing a drive circuit associated with a stepping motor used in the suspension control system of FIG. 1.

Referring to FIG. 2, there is shown a variable damping force type shock absorber which may be used with the suspension control system. The shock absorber SA includes a cylinder 1 and a piston 2 mounted for reciprocal motion within the cylinder 1. The piston 2 defines upper and lower chambers A and B on the opposite sides thereof. An outer envelop 4 is placed to surround the cylinder 1 so as to define a reservoir C along therewith. A base 5 is provided to separate the reservoir C from the lower chamber B. A piston rod 6 is coupled to the piston 2 for sliding movement. The sliding movement of the piston rod 6 is guided by a guide member 7. A suspension spring 8 is seated between the outer envelop 4 and the vehicle body. The numeral 9 designates a bumper rubber member (or bushing) The piston rod 6 contains a rotary valve 10. The stepping motor 3 is placed on the top end of the shock absorber SA for rotating the rotary valve 10 through a control rod 11. The stepping motor 3 may be of the unipolar four-phase type having two excitation phases, as shown in FIG. 3. The control signal is produced to select four excitation patterns (A'-B, A-B', A-B and A'-B), that is, four combinations of adjacent two phases, one by one in a predetermined sequence to drive the stepping motor 3 step by step in each excitation cycle.

Figure 4:
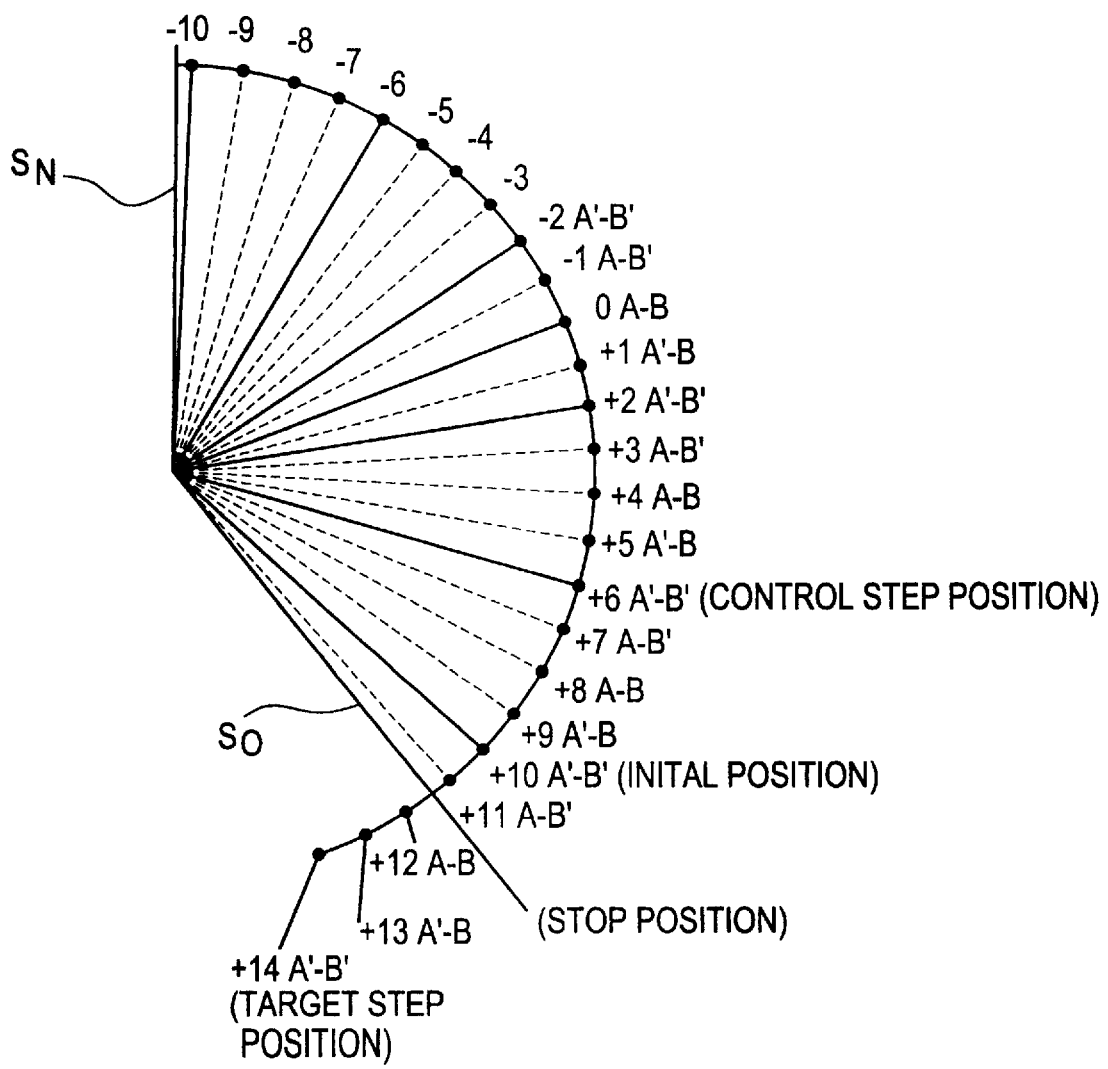
FIG. 4 is a diagram showing stepping motor step positions in connection with the excitation patterns.

FIG. 4 shows the step positions of the stepping motor 3 in connection with the excitation patterns. The stepping motor 3 rotates through step positions 0 to −10 in a first direction. The rotation of the stepping motor 3 in the first direction is limited by a stopper placed at a stop position SN. The stepping motor 3 also rotates through step positions 0 to +11 in a second direction opposite to the first direction. The rotation of the stepping motor 3 in the second direction is limited by a stopper placed at a stop position So. The step positions +12, +13 and +14 are imaginary positions to which the stepping motor 3 cannot rotate by the presence of the stopper placed at the stop position So. The stop position So is set between the step positions +11 corresponding to the excitation pattern (A-B') and the step position +12 corresponding to the excitation pattern (A-B). The step position +10, which is two steps before the stop position So, is an initial step position. The step position +14 corresponds to the same excitation pattern (A'-B') as the initial step position +10.

It is now assumed that the stepping motor 3 is required to rotate to a control step position +6 which was stored in the memory upon interruption of the power to the control unit 12. First of all, the stepping motor 3 is returned to its initial step position +10. This initialization is made by setting a target step position at +14 and then producing a control signal to drive the stepping motor 3 to eight steps (8=14−6 where 14 is the step number of the target step position +14 and 6 is the step number of the control step position +6) in the second direction. The step number (14) of the target step position +14 corresponds to the sum of the step number (10) of the initial step position +10 and the number (in the illustrated case 4) of the excitation patterns included in one excitation cycle.

Figure 5:
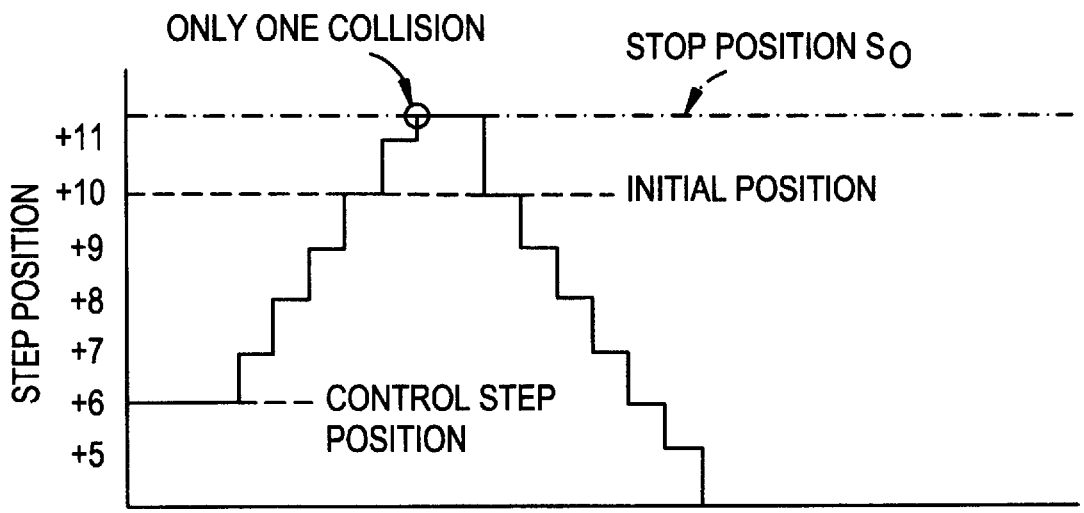
FIG. 5 is a graph showing stepping motor step position changes made according to the invention.

After the excitation pattern is changed from (A-B') corresponding to the step position +11 to (A-B) corresponding to the step position +12, the stepping motor 3 has its rotor brought into abutment with the stopper and stops at the stop position So. Thus, the stepping motor 3 remains stopped at the stop position So even when the excitation pattern is changed from (A-B) to (A'-B) corresponding to the step position +13. When the excitation pattern is changed from (A'-B) to (A'-B') corresponding to the target step position +14, the stepping motor 3 rotates to the initial step position +10 corresponding to the same excitation pattern (A'-B') as the target step position +14 since the initial step position +10 is closer to the stop position So than the target step position +14. therefore, the number of times the rotor of the stepping motor 3 comes into collision with the stopper placed at the stop position So is always one, as shown in FIG. 5.

While the invention has been described on such an assumption that the actual step position occupied by the stepping motor 3 when the power to the control unit 12 is resumed is the same as the control step position stored in the memory when the power to the control unit 12 is interrupted, it is to be understood that the actual and control step positions may be different for any of reasons including stepping motor replacement. Since the stepping motor 3 is commanded to make extra steps corresponding to the number of excitation patterns included in one excitation cycle during initializing operation, the initializing operation can rotate the stepping motor 3 to the initial step position +10 if the difference between the actual and control step positions is within four (the number of the excitation patterns included in one excitation cycle) plus one. This will be described further on such an assumption that the actual and control step positions are +1 and +6. Since the stepping motor 3 is controlled to make one step in the second direction toward the step position +2 at a moment when the power to the control unit 12 is resumed. By the following initializing operation, the stepping motor 3 is controlled to make eight steps in the second direction from the step position +2, that is, the stepping motor 3 rotates to the initial step position +10 (+2+8). In this case, the rotor of the stepping motor 3 does not come into collision with the stopper placed in the stop position So.

It is preferable to decrease step drive velocity (the velocity of stepped rotation of the stepping motor 3) by setting the step drive frequency (the frequency of stepped rotation of the stepping motor 3) at a lower value during the initializing operation than during normal operation subsequent to the initializing operation. This is effective to reduce the noise produced when the rotor of the stepping motor 3 comes into collision with the stopper placed at the stop position So.

Figure 6:
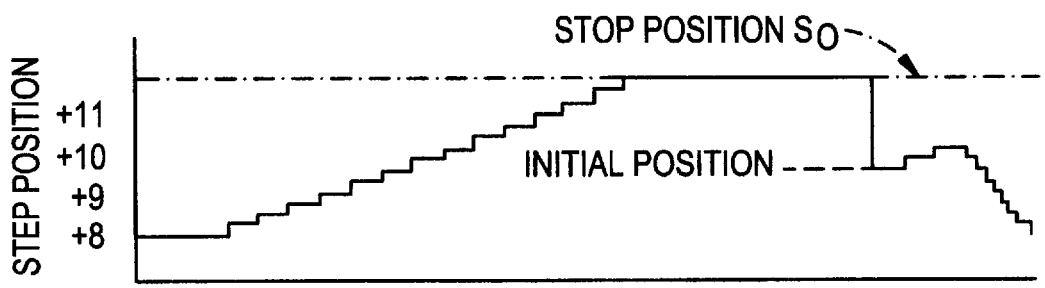
FIG. 6 is a graph showing stepping motor step position changes made according to a modified form of the invention.

The control unit 12 may be modified to include a micro step driver provided for driving each of the stepping motors 3. The micro step driver drives the corresponding stepping motor 3 in a plurality of steps between the adjacent two step positions, as shown in FIG. 6. In this modification, the drive step angle of the stepping motor and thus the angular acceleration of rotation of the stepping motor can be reduced. It is, therefore, possible to reduce the noise produced when the rotor of the stepping motor comes into collision with the stopper placed at the stop position So. It is to be understood that the control unit 12 may be arranged to operate micro step driver only during the initializing operation.

While the invention has been described in connection with a specified embodiment thereof, it is evident that many alternatives, modifications and variations will be apparent to those skilled in the art. For example, the stepping motors 3 used in this invention are not limited to the unipolar four-phase type. Accordingly, it is intended to embrace all alternatives, modifications and variations that fall within the scope of the appended claims.

What is claimed is:

1. A method of driving a stepping motor operable on a control signal having a predetermined number of excitation patterns switched in a predetermined sequence during each excitation cycle to rotate, at a predetermined angle defined by two stop positions, through step positions having sequential step numbers with respect to a reference step position, comprising the steps of:

with a control unit powered from a source of power for producing the control signal to the stepping motor, the control unit having a memory for storing a control step position upon interruption of the power to the control unit, the control unit resetting the stepping motor to an initial step position set near one of the stop positions when the power to the control unit is resumed, setting a target step position at a step number equal to the step number of the initial step position plus the number of excitation patterns included in each excitation cycle; and driving the stepping motor to make steps in number equal to a difference of the step number of the control step position stored in the memory from the step number of the target step position.

2. The stepping motor driving method as claimed in claim 1, wherein the stepping motor is returned to the initial step position by operating a micro step driver to drive the stepping motor in a plurality of steps between adjacent step positions.

3. The stepping motor driving method as claimed in claim 2, wherein the stepping motor is used to control a damping force characteristic of a variable damping force type shock absorber.

4. The stepping motor driving method as claimed in claim 1, wherein the stepping motor is used to control a damping force characteristic of a variable damping force type shock absorber.

\* \* \* \* \*